US011415335B2

(12) United States Patent
Peterson et al.

(10) Patent No.: US 11,415,335 B2
(45) Date of Patent: Aug. 16, 2022

(54) VALVE ASSEMBLY WITH LOW FLOW COMPENSATION FOR PROPORTIONAL VARIABLE DEADBAND CONTROL

(71) Applicant: Johnson Controls Technology Company, Auburn Hills, MI (US)

(72) Inventors: Jack A. Peterson, Brookfield, WI (US); Kirk H. Drees, Cedarburg, WI (US); Brennan H. Fentzlaff, Oconomowoc, WI (US); Homero L. Noboa, Waukesha, WI (US); Brett M. Lenhardt, Waukesha, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 395 days.

(21) Appl. No.: 16/516,070

(22) Filed: Jul. 18, 2019

(65) Prior Publication Data

US 2021/0018214 A1 Jan. 21, 2021

(51) Int. Cl.
*F24F 11/84* (2018.01)
*F16K 1/52* (2006.01)
*F16K 31/04* (2006.01)

(52) U.S. Cl.
CPC ............... *F24F 11/84* (2018.01); *F16K 1/52* (2013.01); *F16K 31/04* (2013.01)

(58) Field of Classification Search
CPC ... G05D 7/06; F16K 31/04; F16K 1/52; F24F 11/84
See application file for complete search history.

(56) References Cited

U.S. PATENT DOCUMENTS

| | | | |
|---|---|---|---|
| 5,768,121 A | 6/1998 | Federspiel | |
| 5,867,384 A * | 2/1999 | Drees | G05B 5/01 |
| | | | 700/42 |
| 5,875,109 A | 2/1999 | Federspiel | |
| 6,352,106 B1 | 3/2002 | Hartman | |
| 8,825,185 B2 | 9/2014 | Salsbury | |
(Continued)

FOREIGN PATENT DOCUMENTS

| | | | | |
|---|---|---|---|---|
| EP | 3 531 225 A1 | 8/2019 | | |
| EP | 3483690 B1 * | 10/2020 | ........... | G05D 7/0635 |

OTHER PUBLICATIONS

Extended European Search Report on EP 19203206.8, dated May 14, 2020, 8 pages.

*Primary Examiner* — Schyler S Sanks
(74) *Attorney, Agent, or Firm* — Foley & Lardner LLP

(57) ABSTRACT

A system for controlling a flow rate of a fluid through a valve is provided. The system includes a valve and an actuator. The actuator includes a motor and a drive device that is coupled to the valve for driving the valve between multiple positions. The system further includes a flow rate sensor and a controller that is communicably coupled with the flow rate sensor and the motor. The controller is configured to receive a first flow rate setpoint, determine a first actuator position setpoint using a proportional variable deadband control technique based on the first flow rate setpoint and a flow rate measurement, and receive a second flow rate setpoint. In response to a determination that certain low flow criteria are satisfied, the controller is configured to determine a second actuator position setpoint using the proportional variable deadband control technique based on a low flow compensation setpoint.

18 Claims, 10 Drawing Sheets

(56) References Cited

U.S. PATENT DOCUMENTS

| | | | |
|---|---|---|---|
| 9,746,199 B1* | 8/2017 | Drees | F24F 11/76 |
| 2001/0042792 A1 | 11/2001 | Kline et al. | |
| 2016/0334257 A1* | 11/2016 | Brockhaus | G01F 25/0092 |
| 2017/0295058 A1 | 10/2017 | Gottschalk et al. | |
| 2019/0162436 A1 | 5/2019 | Albinger et al. | |

* cited by examiner

VALVE ASSEMBLY WITH LOW FLOW COMPENSATION FOR PROPORTIONAL VARIABLE DEADBAND CONTROL

BACKGROUND

The present invention relates generally to the field of building management systems and associated devices. More particularly, the present disclosure relates to a controller and actuator with valve control capabilities within an HVAC system.

HVAC actuators are used to operate a wide variety of HVAC components such as air dampers, fluid valves, air handling units, and other components that are typically used in HVAC systems. For example, an actuator can be coupled to a damper, valve, or other movable equipment in a HVAC system and can be used to drive the equipment between an open position and a closed position. An actuator typically includes a motor and a drive device (e.g., a hub, a drive train, etc.) that is driven by the motor and coupled to the HVAC component.

The HVAC industry is moving towards the use of control valves capable of maintaining desired water flows regardless of time-varying pressure conditions in the pipes. Some valves are part of a control loop that includes a flow rate sensor that measures the flow rate and sends a signal to a feedback controller. The feedback controller then sends a signal to an actuator to adjust the opening of the valve to achieve the desired flow rate.

Proportional variable deadband control (PVDC) is a type of feedback control that may be implemented in a control valve. The algorithm utilized in PVDC may be configured to assume that a measured control variable (e.g., a flow rate through the valve) is directly related to a previously deployed actuator command. Although PVDC provides several advantages over other feedback control techniques, the characteristics of PVDC can result in slow response times when a low or no flow condition is requested. In some implementations of PVDC, it may even be impossible to achieve a fully closed valve. Accordingly, it would be advantageous to provide an improved implementation of PVDC in a control valve that permits the implementation of valve commands resulting in low or no flow through the valve.

SUMMARY OF THE INVENTION

One implementation of the present disclosure relates to a system for controlling a flow rate of a fluid through a valve. The system includes a valve and an actuator. The actuator includes a motor and a drive device that is coupled to the valve for driving the valve between multiple positions. The system further includes a flow rate sensor and a controller that is communicably coupled with the flow rate sensor and the motor. The controller is configured to receive a first flow rate setpoint, determine a first actuator position setpoint using a proportional variable deadband control technique based on the first flow rate setpoint and at least one flow rate measurement from the flow sensor. The controller is further configured to receive a second flow rate setpoint, and in response to a determination that certain low flow criteria are satisfied, determine a second actuator position setpoint using the proportional variable deadband control technique based on a low flow compensation setpoint and at least one flow rate measurement from the flow sensor.

In some embodiments, the low flow compensation setpoint has a negative flow rate value.

In some embodiments, the low flow compensation setpoint is calculated by subtracting a low flow compensation value from the second flow rate setpoint.

In some embodiments, the low flow criteria includes the second flow rate setpoint satisfying a low flow rate value threshold. In other embodiments, the low flow criteria includes a first elapsed time measured by a first timer satisfying a low flow rate time threshold. In further embodiments, the low flow criteria includes a second elapsed time measured by a second timer satisfying a steady output time threshold.

In some embodiments, the flow rate sensor is an ultrasonic flow rate sensor.

In some embodiments, the controller is further configured to operate the motor to drive the drive device to the second actuator position setpoint.

In some embodiments, the second actuator position setpoint corresponds with a fully closed valve position.

Another implementation of the present disclosure relates to a method for controlling a flow rate of a fluid through a valve. The method includes receiving a first flow rate setpoint, determining a first actuator position setpoint using a proportional variable deadband control technique based on the first flow rate setpoint and at least one flow rate measurement from a flow rate sensor, and driving an actuator to the first actuator position setpoint. The actuator is coupled to the valve in order to drive the valve between multiple positions. The method further includes receiving a second flow rate setpoint and in response to a determination that each of a plurality of low flow criteria are satisfied, determining a second actuator position setpoint using the proportional variable deadband control technique based on a low flow compensation setpoint and at least one flow rate measurement from the flow rate sensor.

In some embodiments, the low flow compensation setpoint has a negative flow rate value.

In some embodiments, the method includes calculating the low flow compensation setpoint by subtracting a low flow compensation value from the second flow rate setpoint.

In some embodiments, the low flow criteria includes the second flow rate setpoint satisfying a low flow rate value threshold. In other embodiments, the low flow criteria includes a first elapsed time measured by a first timer satisfying a low flow rate time threshold. In further embodiments, the low flow criteria includes a second elapsed time measured by a second timer satisfying a steady output time threshold.

In some embodiments, the method includes driving the actuator to the second actuator position setpoint.

In some embodiments, the second actuator position setpoint corresponds with a fully closed valve position.

Yet another implementation of the present disclosure is a system for controlling a flow rate of a fluid through a valve. The system includes a valve configured to regulate a flow of fluid through a conduit, and an actuator with a motor and a drive device. The drive device is driven by the motor and is coupled to the valve for driving the valve between multiple positions. The system further includes a flow rate sensor configured to measure the flow rate of the fluid through the valve and a controller that is communicably coupled with the flow rate sensor and the motor. The controller is configured to receive a flow rate measurement from the flow rate sensor and receive a flow rate setpoint. In response to a determination that the flow rate setpoint satisfies a low flow rate value threshold, the controller begins a first timer. In response to a determination that an output of a proportional variable deadband control technique does not exceed an output change threshold, the controller determines whether an elapsed time of the first timer satisfies a low flow rate time threshold. In response to a determination that the elapsed time of the first timer satisfies the low flow rate time threshold, the controller begins a second timer. Finally, in response to a determination that an elapsed time of the second timer satisfies a steady output time threshold, the controller determines an actuator position setpoint using the proportional variable deadband control technique based on a low flow compensation setpoint and the flow rate measurement.

In some embodiments, the proportional variable deadband control technique includes determining whether the flow rate measurement is within a deadband range centered on the low flow compensation setpoint.

In some embodiments, the low flow compensation setpoint has a negative flow rate value.

DETAILED DESCRIPTION

Overview

Figure 1:
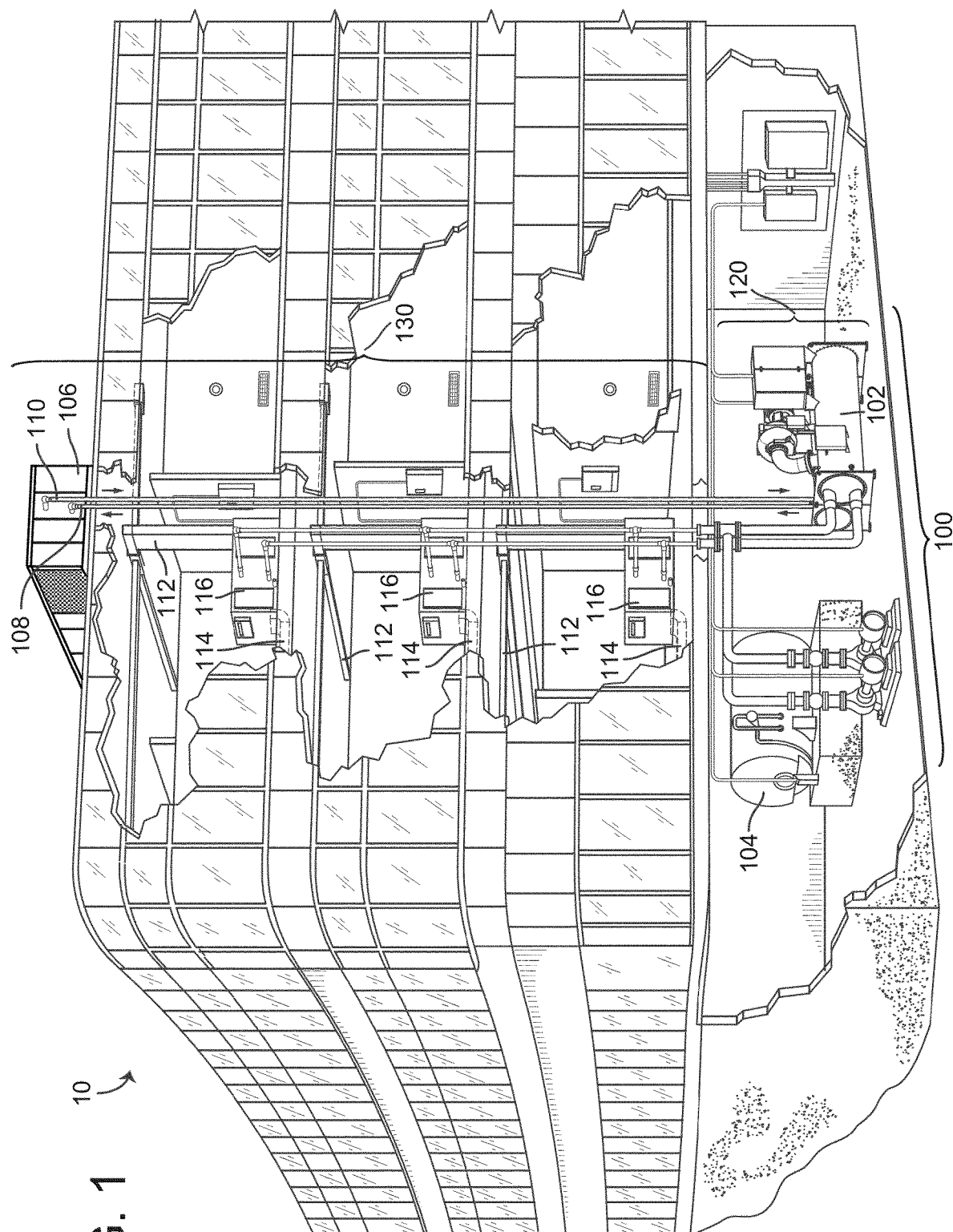
FIG. 1 is a drawing of a building equipped with a HVAC system, according to some embodiments.

Before turning to the FIGURES, which illustrate the exemplary embodiments in detail, it should be understood that the disclosure is not limited to the details or methodology set forth in the description or illustrated in the figures. It should be understood that the terminology is for the purpose of the description only and should not regarded as limiting.

Referring generally to the FIGURES, various systems and methods for bypassing proportional variable deadband control (PVDC) of a valve assembly during low flow conditions are provided. The valve assembly includes, at minimum, an electronically-controlled actuator, a valve, and a flow sensor. The flow sensor measures the flow rate or velocity of fluid flowing through the valve and may be integrated within the valve or packaged as a separate device.

The position of the electronically-controlled actuator (and the valve, which is driven by the actuator) may be controlled using a PVDC technique based on flow measurements received either at the actuator or an actuator controller. PVDC is an aggressive type of closed loop control with fast process loops. In short, the technique applies a deadband filter region to a setpoint value. When a measured variable (e.g., flow rate) falls within the deadband filter region, the error between the measured variable and the setpoint value is driven to zero. If the measured variable falls outside of the deadband region, the error between the measured variable and the setpoint value is reduced based on the size of the deadband filter.

Although PVDC was originally implemented in variable air volume (VAV) units to control air flows in airside systems, PVDC techniques may also be utilized by valve actuator controllers to control fluid flows in waterside systems. However, a difference between these applications is the necessity of achieving a full flow shutoff condition. VAV units are not intended to cut off air flows entirely under normal operating conditions, while valve actuators must be able to fully shut off flow through a valve. This is particularly important when the valve is supplying fluid to a water coil, because even a small amount of flow can result in a relatively large amount of heat transfer to the supply air traveling past the water coil, and can result in supply air that is higher than a temperature setpoint.

The embodiments described herein avoid this problem by modifying the output of a valve actuator controller employing PVDC techniques when the following conditions are satisfied: 1) a zero flow setpoint is received at the controller and 2) the PVDC output (i.e., a position command for the valve actuator) is not changing in response to the zero flow setpoint. When both conditions are satisfied, the valve actuator controller implements a low flow bypass process, which can include replacing the zero or low flow setpoint with a negative value flow setpoint. Although physically impossible to achieve through the valve assembly, the negative setpoint value shifts the deadband so that the measured flow rate falls outside the deadband region. This increases the error between the setpoint value and the measured flow rate to a non-zero value, and causes the controller to drive the actuator to close the value in order to drive the error to zero.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple VAV units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
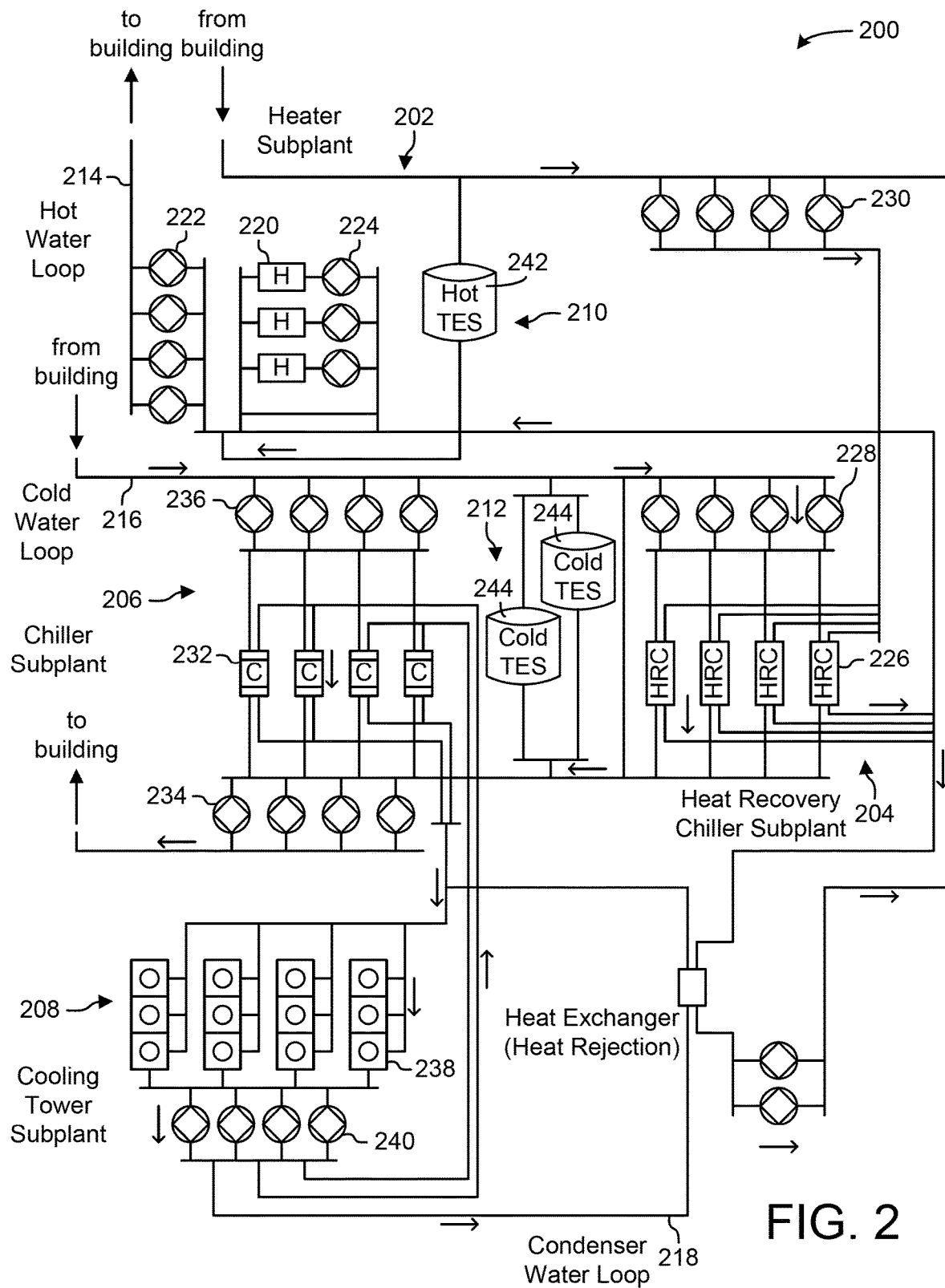
FIG. 2 is a block diagram of a waterside system that may be used in conjunction with the building of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
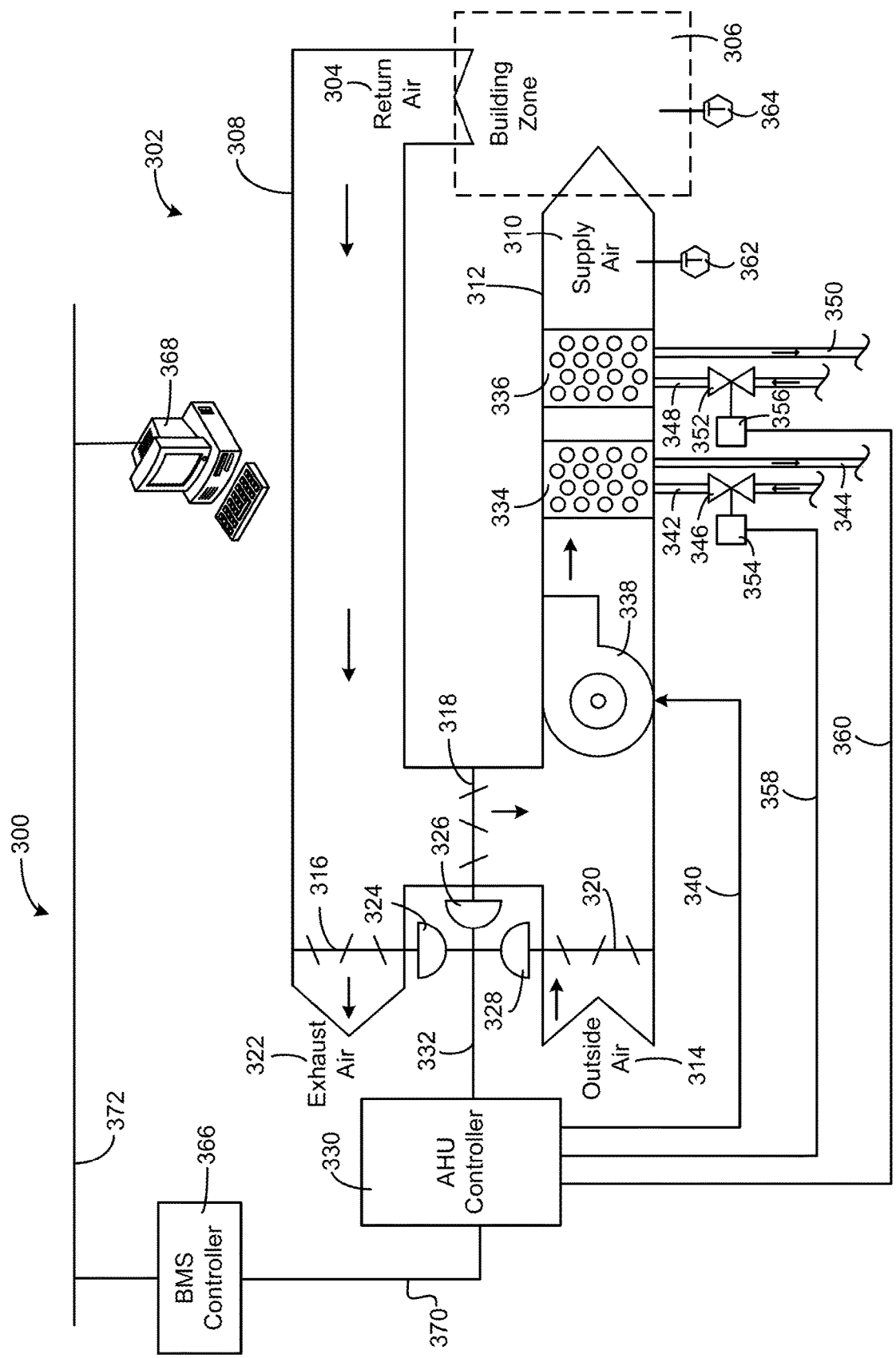
FIG. 3 is a block diagram of an airside system that may be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
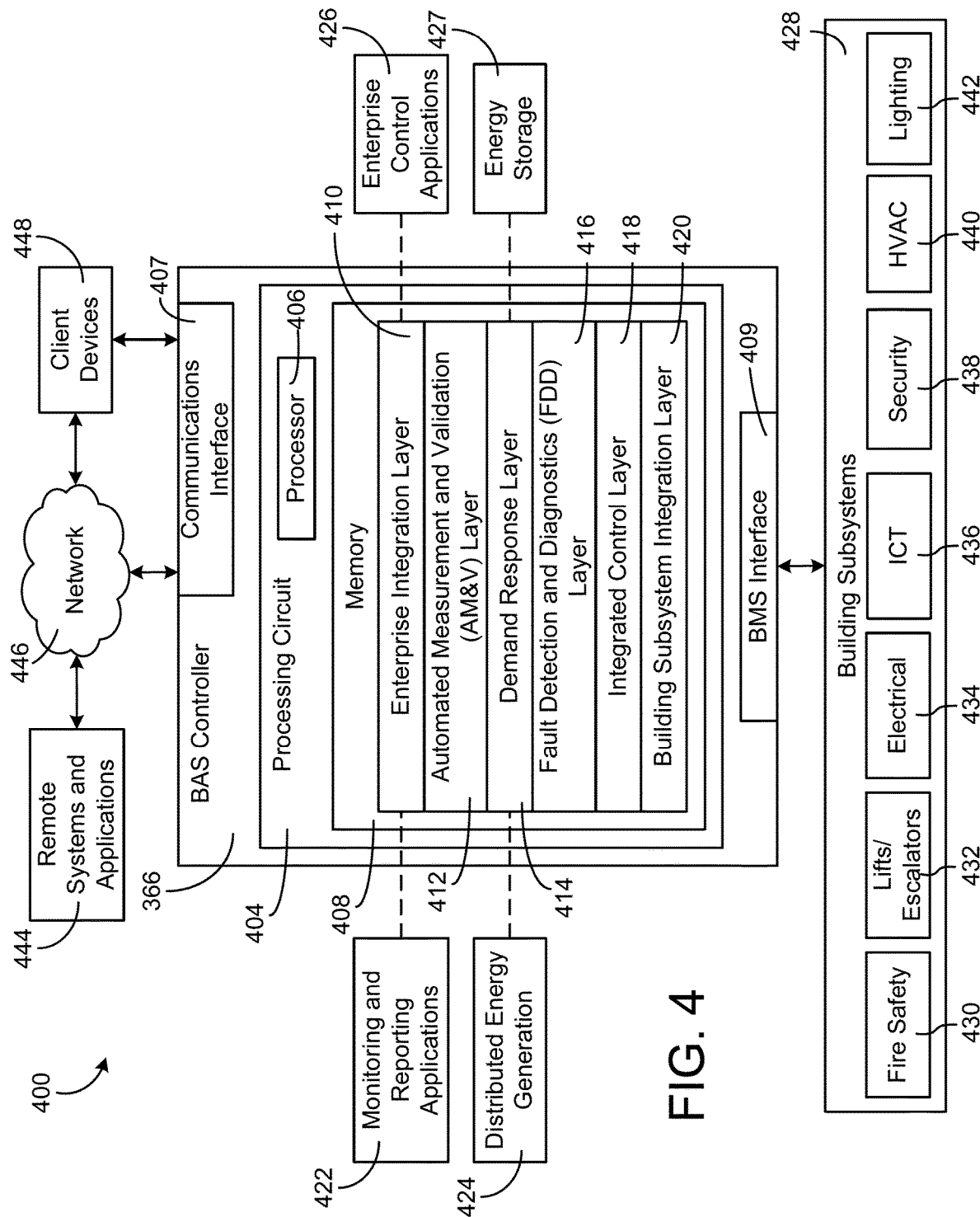
FIG. 4 is a block diagram of a building management system (BMS) which may be used to monitor and control the building of FIG. 1, according to some embodiments.

Referring now to FIG. 4, a block diagram of a building management system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 may be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 may include an Ethernet card and port for sending and receiving data via an Ethernet-based communications link or network. In another example, interfaces 407, 409 may include a Wi-Fi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407, 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

Valve and Actuator Assembly

Figure 5:
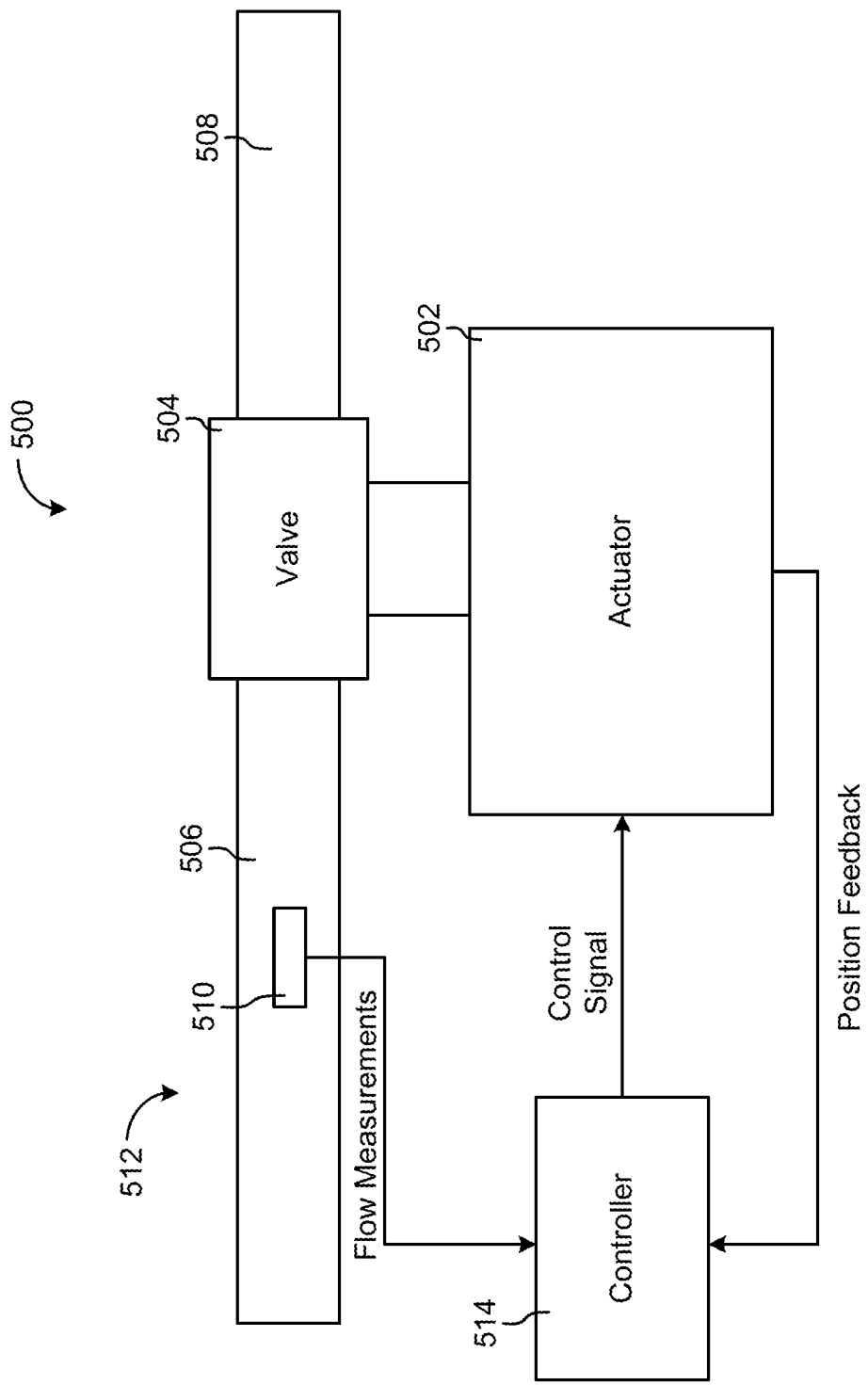
FIG. 5 is a block diagram of an actuator, valve device, and controller that may be implemented in the HVAC system of FIG. 1, according to some embodiments.

Referring now to FIG. 5, a block diagram of a system 500 including an actuator 502, a valve device 504, and a controller 514 is shown, according to some embodiments. System 500 may be implemented in HVAC system 100, waterside system 200, airside system 300, or BMS 400, as described with reference to FIGS. 1-4. As shown, actuator 502 may be coupled to valve device 504. For example, actuator 502 may be a damper actuator, a fan actuator, a pump actuator, or any other type of actuator that may be used in an HVAC system or BMS. In various embodiments, actuator 502 may be a linear actuator (e.g., a linear proportional actuator), a non-linear actuator, a spring return actuator, or a non-spring return actuator.

Valve device 504 may be any type of control device configured to control an environmental parameter in an HVAC system, including a 2-way or 3-way two position electric motorized valve, a ball isolation value, a floating point control valve, an adjustable flow control device, or a modulating control valve. In some embodiments, valve device 504 may regulate the flow of fluid through a conduit, pipe, or tube (e.g., conduit 512) in a waterside system (e.g., waterside system 200, shown in FIG. 2). Conduit 512 may include upstream conduit section 506 and downstream conduit section 508. In other embodiments, valve 504 may regulate the flow of air through a duct in an airside system (e.g., airside system 300, shown in FIG. 3).

Still referring to FIG. 5, flow sensor 510 is shown to be disposed within upstream conduit section 506. Flow sensor 510 may be configured to measure the flow rate or velocity of fluid passing through conduit 512, and more specifically, the flow rate of fluid entering valve 504. Flow sensor 510 may be any type of device (e.g., ultrasonic detector, paddle-wheel sensor, pitot tube, drag-force flowmeter) configured to measure the flow rate or velocity using any applicable flow sensing method.

In some embodiments, flow sensor 510 may be a heated thermistor flow sensor that operates according to the principles of King's Law. According to King's Law, the heat transfer from a heated object exposed to a moving fluid is a function of the velocity of the fluid. King's Law devices have several features, including very high sensitivity at low flow rates and measurement of the fluid temperature (which may be useful for fault detection and control purposes), although they have decreased sensitivity at high flow rates.

In other embodiments, flow sensor 510 may be a vortex-shedding flowmeter configured to determine the fluid flow rate by calculating the Strouhal number. The Strouhal number is a dimensionless value useful for characterizing oscillating flow dynamics. A vortex-shedding flowmeter measures the flow rate via acoustic detection of vortices in fluid caused when the fluid flows past a cylindrically-shaped obstruction. The vibrating frequency of the vortex shedding is correlated to the flow velocity. Vortex-shedding flowmeters generally have good sensitivity over a range of flow rates, although they require a minimum flow rate in order to be operational.

In some embodiments, flow sensor 510 may be communicably coupled to actuator 502. For example, flow sensor 510 may be coupled via wired or wireless connection to a controller 514 of system 500 for the purpose of transmission of flow rate measurements. In various embodiments, flow rate data signals may be used by the controller of device 500 to determine control operations for actuator 502 and/or valve 504. In further embodiments, flow sensor 510 may be disposed within valve 504 to measure the rate of fluid flow before the fluid exits valve 504. When flow sensor 510 is located within valve 504, flow sensor 510 may additionally function as a fault detection mechanism for system 500. For example, when debris becomes lodged in actuator 502 or valve 504, flow through valve 504 may be significantly reduced. This reduction in flow may occur because the components of actuator 502 cannot freely operate valve 504, or because the debris within valve 504 obstructs flow through conduit 512.

As shown in FIG. 5, controller 514 may receive input signals such as flow measurements from flow sensor 510 and position feedback signals from actuator 502. The position feedback signals may be used by controller 514 to determine control operations for actuator 502 and/or valve 504. Controller 514 may provide a control signal to actuator 502. The control signal may be used to operate actuator 502. The control signal may be determined by the controller using various methods. In some situations, the control signal may be determined based on a combination of inputs (e.g., flow measurements, position feedback). In some embodiments, the control signal may be at least partially determined by known properties and/or experimentally determined values associated with valve 504.

Figure 6:
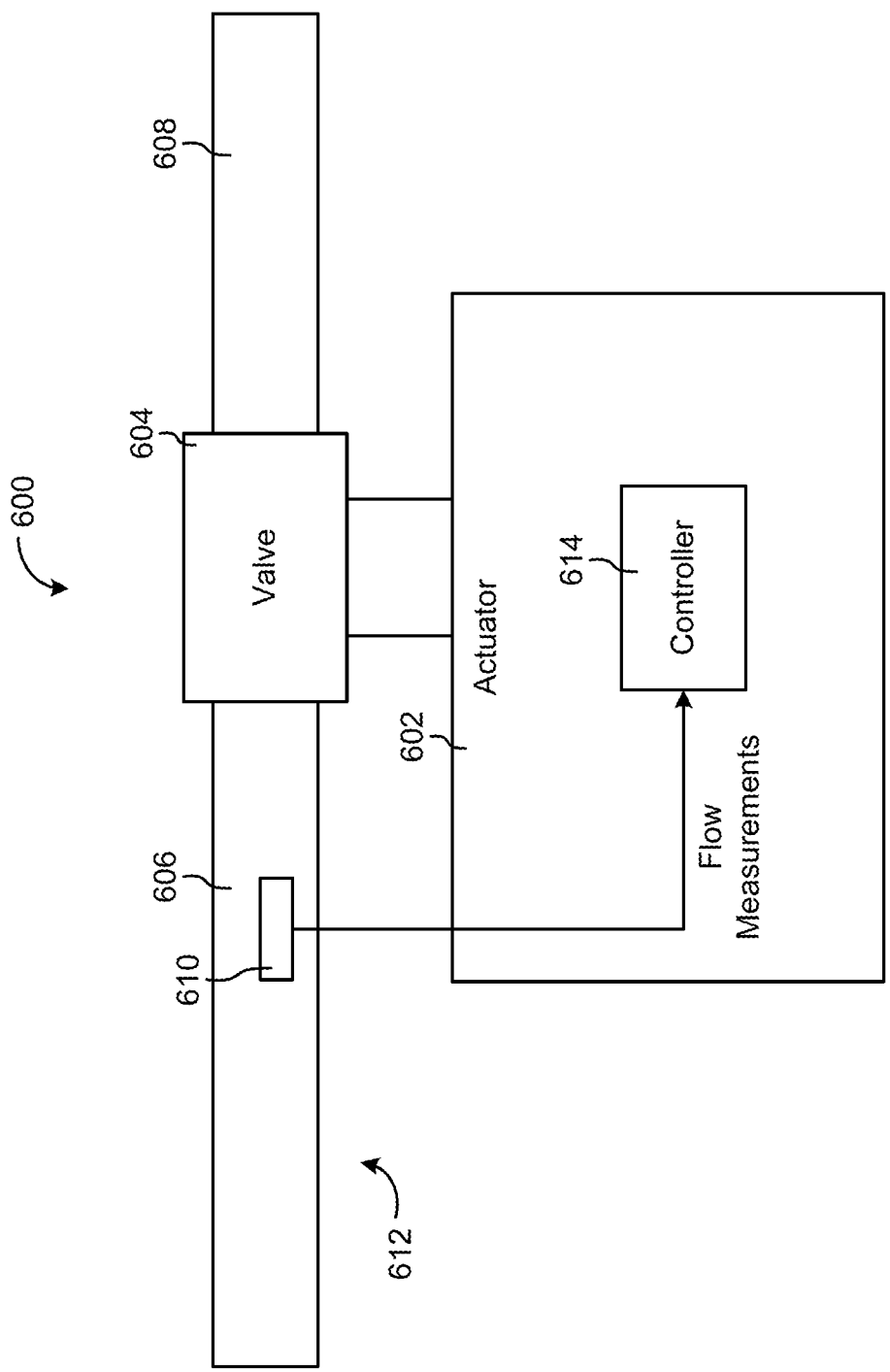
FIG. 6 is a block diagram of an integrated actuator and valve device that may be implemented in the HVAC system of FIG. 1, according to some embodiments.

Referring now to FIG. 6, a block diagram of another system 600 is shown, according to some embodiments. System 600 may be used in HVAC system 100, waterside system 200, airside system 300, or BMS 400, as described with reference to FIGS. 1-4. System 600 may represent an alternate configuration of system 500. For example, controller 614 may be contained within actuator 602. Specifically, controller 614 and actuator 602 may be packaged and installed as a single component. As shown, controller 614 receives flow measurements from flow sensor 610.

System 600 may be such that valve device 604 may regulate the flow of fluid through a conduit, pipe, or tube (e.g., conduit 612) in a waterside system (e.g., waterside system 200, shown in FIG. 2). Conduit 612 may include upstream conduit section 606 and downstream conduit section 608. Flow sensor 610 may be disposed within upstream conduit section 606. Valve 604 may function similarly to valve 504, as previously described. Examples of "smart actuators" including a controller which can be used in system 500 and/or system 600 are described in detail in U.S. Pat. No. 9,746,199 issued on Aug. 29, 2017 and entitled "Integrated Smart Actuator and Valve Device." The entire disclosure of this patent is incorporated by reference herein.

Figure 7:
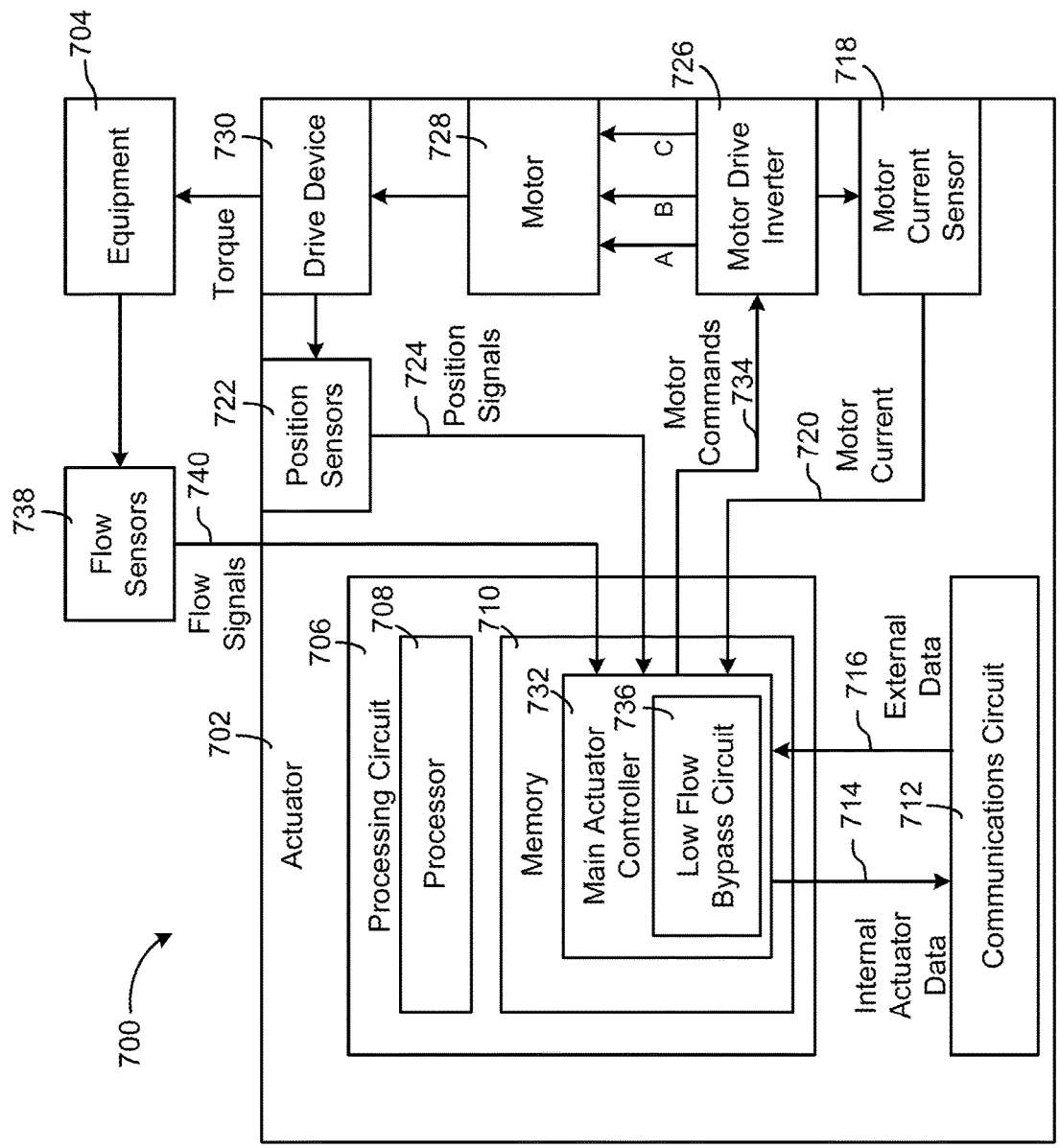
FIG. 7 is a block diagram of another integrated actuator and valve device that may be implemented in the HVAC system of FIG. 1, according to some embodiments.

Turning now to FIG. 7, a block diagram of another system 700 is shown, according to some embodiments. System 700 may be used in HVAC system 100, waterside system 200, airside system 300, or BMS 400, as described with reference to FIGS. 1-4. In some embodiments, system 700 may represent a more detailed version of system 600. For example, system 700 is shown to include actuator 702, which may be identical or substantially similar to actuator 602 in system 600. Actuator 702 may be configured to operate equipment 704. Equipment 704 may include any type of system or device that can be operated by an actuator (e.g., a valve, a damper). In an exemplary embodiment, equipment 704 is a valve.

Actuator 702 is shown to include a processing circuit 706 communicably coupled to motor 728. In some embodiments, motor 728 is a brushless DC (BLDC) motor. Processing circuit 706 is shown to include a processor 708, memory 710, and a main actuator controller 732. Processor 708 can be a general purpose or specific purpose processor, an application specific integrated circuit (ASIC), one or more field programmable gate arrays (FPGAs), a group of processing components, or other suitable processing components. Processor 708 can be configured to execute computer code or instructions stored in memory 710 or received from other computer readable media (e.g., CDROM, network storage, a remote server, etc.).

Memory 710 may include one or more devices (e.g., memory units, memory devices, storage devices, etc.) for storing data and/or computer code for completing and/or facilitating the various processes described in the present disclosure. Memory 710 may include random access memory (RAM), read-only memory (ROM), hard drive storage, temporary storage, non-volatile memory, flash memory, optical memory, or any other suitable memory for storing software objects and/or computer instructions. Memory 710 may include database components, object code components, script components, or any other type of information structure for supporting the various activities and information structures described in the present disclosure. Memory 710 can be communicably connected to processor 708 via processing circuit 706 and may include computer code for executing (e.g., by processor 708) one or more processes described herein. When processor 708 executes instructions stored in memory 710, processor 708 generally configures actuator 702 (and more particularly processing circuit 706) to complete such activities.

Main actuator controller 732 may be configured to receive external control data 716 (e.g., position setpoints, speed setpoints, etc.) from communications circuit 712, position signals 724 from position sensors 722, and flow signals 740 from flow sensors 738. Main actuator controller 732 may be configured to determine the position of motor 728 and/or drive device 730 based on position signals 724. In some embodiments, main actuator controller 732 receives data from additional sources. For example, motor current sensor 718 may be configured to measure the electric current provided to motor 728. Motor current sensor 718 may generate a feedback signal indicating the motor current 720 and may provide this signal to main actuator controller 732 within processing circuit 708.

Figure 8:
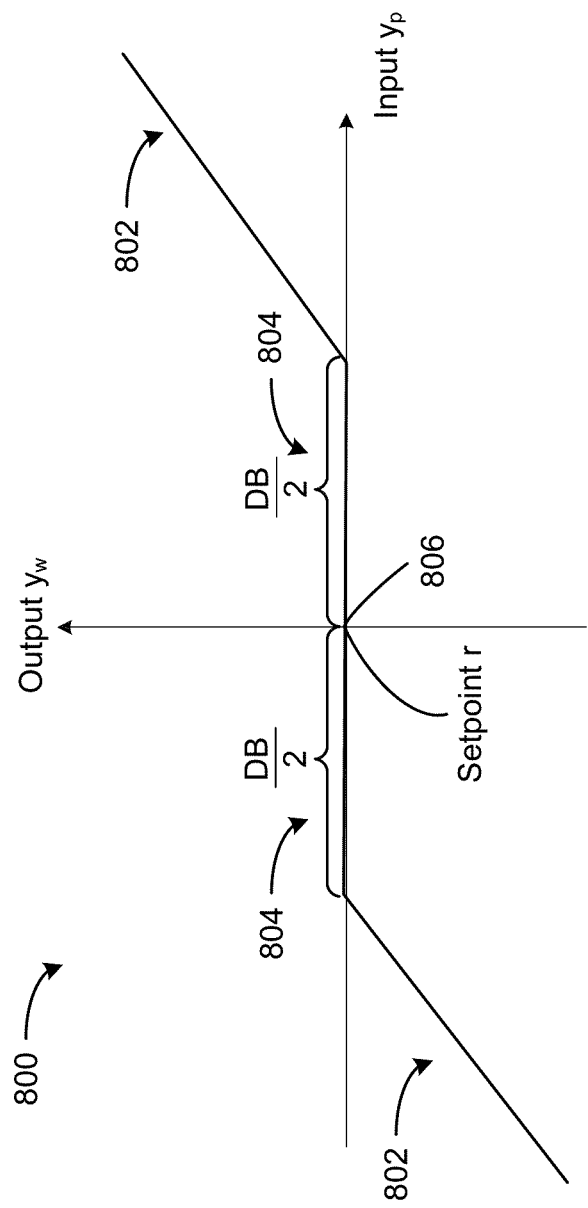
FIG. 8 is a graph illustrating a proportional variable deadband control (PVDC) technique which may be implemented in the present disclosure, according to some embodiments.

Low flow bypass circuit 736 may be configured to utilize data received by the main actuator controller 732 (e.g., external data 716, position signals 724, flow signals 740) in order to detect low or zero flow rate setpoints (i.e., external data 716) and compensate for these setpoints when the feedback signals (i.e., position signals 724, flow signals 740) do not indicate achievement of the low or zero rate setpoints. In some embodiments, low flow bypass circuit 736 stores various rules and data (e.g., deadband sizes, flow rate value thresholds, time thresholds, low flow compensation values) related to the detection of and compensation for low or zero flow setpoint conditions. Further details are included below with reference to FIGS. 8-10.

Still referring to FIG. 7, processing circuit 708 may be configured to output a pulse width modulated (PWM) DC motor command 734 to control the speed of the motor. Motor 728 may be configured to receive a three-phase PWM voltage output (e.g., phase A, phase B, phase C) from motor drive inverter 726. The duty cycle of the PWM voltage output may define the rotational speed of motor 728 and may be determined by processing circuit 706 (e.g., a microcontroller). Processing circuit 706 may increase the duty cycle of the PWM voltage output to increase the speed of motor 728 and may decrease the duty cycle of the PWM voltage output to decrease the speed of motor 728.

Motor 728 may be coupled to drive device 730. Drive device 730 may be a drive mechanism, a hub, or other device configured to drive or effectuate movement of a HVAC system component (e.g., equipment 704). For example, drive device may be configured to receive a shaft of a damper, a valve, or any other movable HVAC system component in order to drive (e.g., rotate) the shaft. In some embodiments, actuator 702 includes a coupling device configured to aid in coupling drive device 730 to the movable HVAC system component. For example, the coupling device may facilitate attaching drive device 730 to a valve or damper shaft.

Position sensors 722 may include Hall effect sensors, potentiometers, optical sensors, or other types of sensors configured to measure the rotational position of the motor 728 and/or drive device 730. Position sensors 722 may provide position signals 724 to processing circuit 706. Main actuator controller 732 may use position signals 724 to determine whether to operate the motor 728. For example, main actuator controller 732 may compare the current position of drive device 730 with a position setpoint received via external data input 716 and may operate the motor 728 to achieve the position setpoint.

Actuator 702 is further shown to include a communications circuit 712. Communications circuit 712 may be a wired or wireless communications link and may use any of a variety of disparate communications protocols (e.g., BACnet, LON, WiFi, Bluetooth, NFC, TCP/IP, etc.). In some embodiments, communications circuit 712 is an integrated circuit, chip, or microcontroller unit (MCU) configured to bridge communications actuator 702 and external systems or devices. In some embodiments, communications circuit 712 is the Johnson Controls BACnet on a Chip (JBOC) product. For example, communications circuit 712 can be a pre-certified BACnet communication module capable of communicating on a building automation and controls network (BACnet) using a master/slave token passing (MSTP) protocol. Communications circuit 712 can be added to any existing product to enable BACnet communication with minimal software and hardware design effort. In other words, communications circuit 712 provides a BACnet interface for the valve assembly 700. Further details regarding the JBOC product are disclosed in U.S. patent application Ser. No. 15/207,431 filed Jul. 11, 2016, the entire disclosure of which is incorporated by reference herein.

Communications circuit 712 may also be configured to support data communications within actuator 702. In some embodiments, communications circuit 712 may receive internal actuator data 714 from main actuator controller 732. For example, internal actuator data 714 may include the sensed motor current 720, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 704 (e.g., a valve), or any other type of data used or stored internally within actuator 702. In some embodiments, communications circuit 712 may transmit external data 716 to main actuator controller 732. External data 716 may include, for example, position setpoints, speed setpoints, control signals, configuration parameters, end stop locations, stroke length parameters, commissioning data, equipment model data, actuator firmware, actuator software, or any other type of data which can be used by actuator 702 to operate the motor 728 and/or drive device 730.

In some embodiments, external data 716 is a DC voltage control signal. Actuator 702 can be a linear proportional actuator configured to control the position of drive device 630 according to the value of the DC voltage received. For example, a minimum input voltage (e.g., 0.0 VDC) may correspond to a minimum rotational position of drive device 730 (e.g., 0 degrees, −5 degrees, etc.), whereas a maximum input voltage (e.g., 10.0 VDC) may correspond to a maximum rotational position of drive device 730 (e.g., 90 degrees, 95 degrees, etc.). Input voltages between the minimum and maximum input voltages may cause actuator 702 to move drive device 730 into an intermediate position between the minimum rotational position and the maximum rotational position. In other embodiments, actuator 702 can be a non-linear actuator or may use different input voltage ranges or a different type of input control signal (e.g., AC voltage or current) to control the position and/or rotational speed of drive device 730.

In some embodiments, external data 716 is an AC voltage control signal. Communications circuit 712 may be configured to transmit an AC voltage signal having a standard power line voltage (e.g., 120 VAC or 230 VAC at 50/60 Hz). The frequency of the voltage signal can be modulated (e.g., by main actuator controller 732) to adjust the rotational position and/or speed of drive device 730. In some embodiments, actuator 702 uses the voltage signal to power various components of actuator 702. Actuator 702 may use the AC voltage signal received via communications circuit 712 as a control signal, a source of electric power, or both. In some embodiments, the voltage signal is received from a power supply line that provides actuator 702 with an AC voltage having a constant or substantially constant frequency (e.g., 120 VAC or 230 VAC at 50 Hz or 60 Hz). Communications circuit 712 may include one or more data connections (separate from the power supply line) through which actuator 702 receives control signals from a controller or another actuator (e.g., 0-10 VDC control signals).

Low-Flow Bypass for Valve Assembly with PVDC

As described above, PVDC techniques may be utilized to control valve flow, according to the present disclosure. FIG.

8 is a plot 800 illustrating the function of PVDC. In some embodiments, controller 514 (as shown in FIG. 5) employs PVDC techniques. In other embodiments, controller 614 (as shown in FIG. 6), main actuator controller 732 (as shown in FIG. 7), and flow/velocity feedback controller 930 (described below in FIG. 9) employ PVDC techniques.

The PVDC technique may include a deadband or deadzone filter. The deadband filter may be configured to filter one or more of the measurements ($y_p$) to generate one or more filtered measurements ($y_w$). In some embodiments, the deadband filter determines whether each measurement ($y_p$) is within a deadband range centered around a setpoint (r) for the measured variable ($y_p$). The setpoint (r) may be provided as an input to the controller employing the PVDC technique.

If the measurement ($y_p$) is within the deadband range $$\left(\text{i.e., } r - \frac{DB}{2} \leq y_p \leq r + \frac{DB}{2}\right),$$

the deadband filter may set the filtered measurement ($y_w$) equal to the setpoint (r). However, if the measurement ($y_p$) is outside the deadband range the $$\left(\text{i.e., } y_p < r - \frac{DB}{2} \text{ or } y_p > r + \frac{DB}{2}\right),$$

deadband filter may add or subtract the deadband threshold $$\left(\frac{DB}{2}\right)$$

from the measurement ($y_p$) to bring the filtered measurement ($y_w$) closer to the setpoint (r). The following equation illustrates the calculation which may be performed by the deadband filter to generate each filtered measurement ($y_w$) as a function of the corresponding raw measurement ($y_p$):

$$y_w = \begin{cases} r & \text{if } |r - y_p| \leq \frac{DB}{2} \\ r - \text{sign}(r - y_p)\left(|r - y_p| - \frac{DB}{2}\right) & \text{if } |r - y_p| > \frac{DB}{2} \end{cases}$$

The horizontal axis of plot 800 represents the measurement ($y_p$) provided as an input to the deadband filter, whereas the vertical axis of plot 800 represents the filtered measurement ($y_w$) provided as an output of the deadband filter. The center point 806 of plot 800 is equal to the setpoint (r) for measured variable ($y_p$). For example, if measured variable ($y_p$) is an actuator position measured in percentage open (%), and the setpoint (r) for the actuator position is 50% open, the center point 806 of plot 800 may have a value of 50% open. In other embodiments, the measured variable ($y_p$) is a flow rate measurement.

Plot 800 is shown to have two sections: a slope section 802 and a deadband section 804. Deadband section 804 has a range of $$\pm \frac{DB}{2}$$

on either side of the setpoint (r). If the input ($y_p$) to the deadband filter falls within deadband section 804

$$\left(\text{i.e., } r - \frac{DB}{2} \leq y_p \leq r + \frac{DB}{2}\right),$$

the output ($y_w$) of the deadband filter is equal to the setpoint (r). However, if the input ($y_p$) to the deadband filter falls within slope section 802, $$\left(\text{i.e., } y_p < r - \frac{DB}{2} \text{ or } y_p > r + \frac{DB}{2}\right),$$

the output ($y_w$) of the deadband filter is a linear function of the input ($y_p$) and is shifted closer to the setpoint (r) by an amount equal to the deadband threshold $$\left(\frac{DB}{2}\right).$$

for example, it the input ($y_p$) falls within slope section 802 and is less than the setpoint (r), then the output ($y_w$) is equal to $$y_p + \frac{DB}{2}.$$

However, it me input ($y_p$) falls within slope section 802 and is greater than the setpoint (r), then the output ($y_w$) is equal to $$y_p - \frac{DB}{2}.$$

Advantageously, the deadband filter operates to reduce the integrated error of the measured variable ($y_p$) relative to the setpoint (r) by establishing a deadband section 804 around the setpoint (r)

$$\left(\text{i.e., } r \pm \frac{DB}{2}\right).$$

If the measurement ($y_p$) falls within deadband section 804, the filtered measurement ($y_w$) will be equal to the setpoint (r) and the error $e = r - y_w$ will be equal to zero. This ensures that the controller may not accumulate a large integrated error (e.g., $\Sigma_{i=1}^{n} e_i$) over time for persistent values of $y_p$ within deadband section 804.

Figure 9:
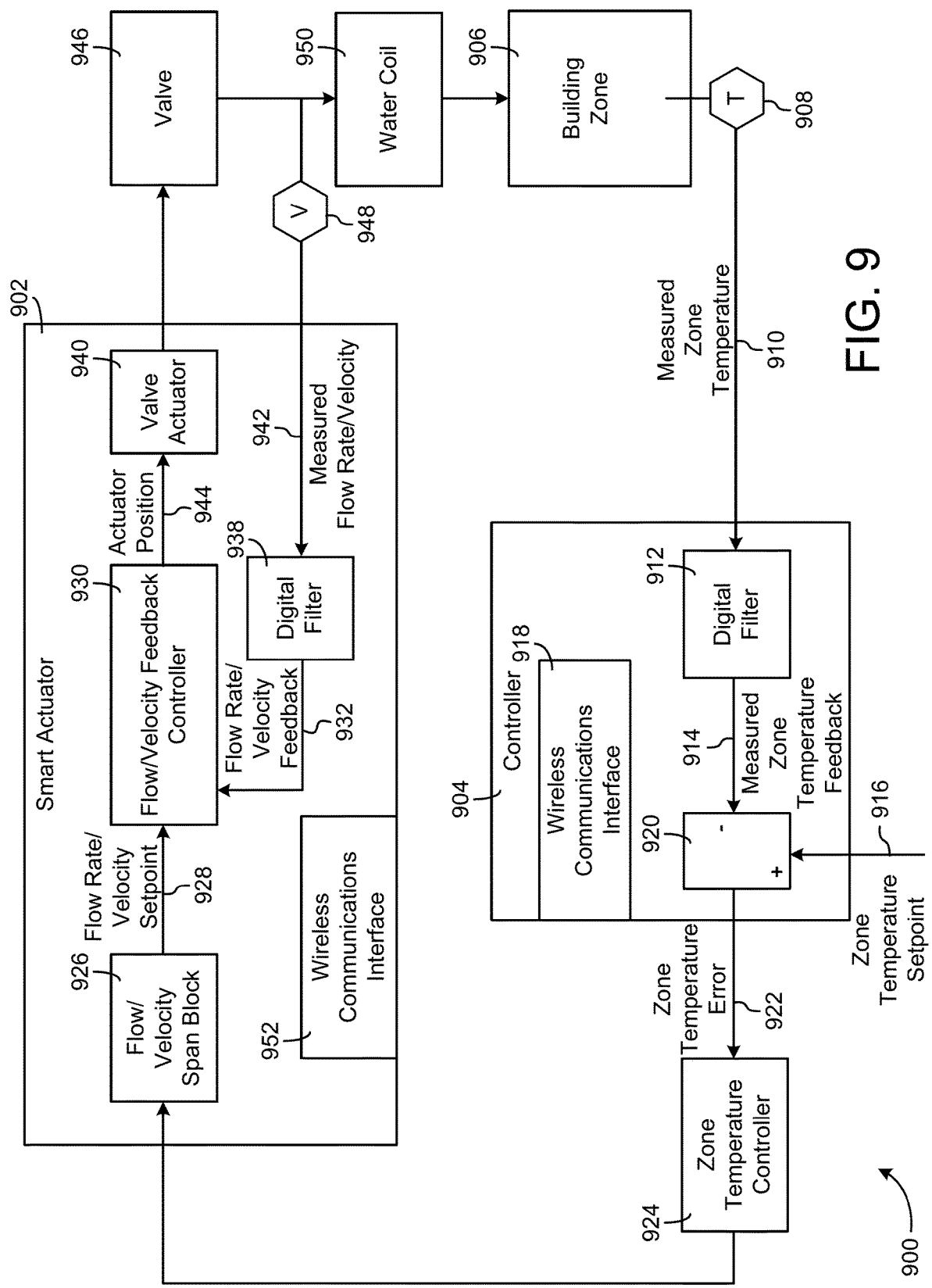
FIG. 9 is a block diagram of an actuator and valve system that may be implemented within a feedback control system, according to some embodiments.

Turning now to FIG. 9, a block diagram of an actuator device 902 within a feedback control system 900 is shown. In some embodiments, the feedback control system 900 is a cascaded feedback control system. In the feedback control system depicted, a primary controller (e.g., controller 904) generates a control signal that serves as the setpoint for a secondary controller (e.g., flow/velocity feedback controller 930). In some embodiments, the control path including the control signal generated by the primary controller may be referred to as an "outer loop," while the control path including the secondary controller may be referred to as an "inner loop." In some embodiments, the feedback control system 900 is a component or subsystem of HVAC system 100, waterside system 200, airside system 300, or BMS 400, as described with reference to FIGS. 1-4.

Feedback control system 900 may include, among other components, actuator device 902, controller 904, building zone 906, zone temperature controller 924, and valve 946. In some embodiments, controller 904 is a primary controller for the components of an HVAC system (e.g., HVAC system 100) within the outer control loop of feedback control system 900. In other embodiments, controller 904 is a thermostat or a BMS controller (e.g., for BMS 400). In still further embodiments, controller 904 is a user device configured to run a building management application (e.g., a mobile phone, a tablet, a laptop). Controller 904 may receive data from temperature sensor 908. Temperature sensor 908 may be any type of sensor or device configured to measure an environmental condition (e.g., temperature) of a building zone 906. Building zone 906 may be any subsection of a building (e.g., a room, a block of rooms, a floor).

Controller 904 is shown to include a digital filter 912, a wireless communications interface 918, and a comparator 920. Measured zone temperature data 910 from temperature sensor 908 may be received as an input signal to digital filter 912. Digital filter 912 may be configured to convert the measured zone temperature data 910 into a measured zone temperature feedback signal 914 that may be provided as an input to comparator 920. In some embodiments, digital filter 912 is a first order low pass filter. In other embodiments, digital filter 912 may be a low pass filter of a different order or a different type of filter.

Controller 904 is further shown to include wireless communications interface 918. In some embodiments, wireless communications interface 918 may communicate data from controller 904 to communications interface 952 of actuator device 902. In other embodiments, communications interfaces 918 and 952 may communicate with other external systems or devices. Communications via interface 918 may be direct (e.g., local wireless communications) or via a communications network (e.g., a WAN, the Internet, a cellular network). For example, interfaces 918 and 952 may include a Wi-Fi transceiver for communicating via wireless communications network. In another example, one or both interfaces 918 and 952 may include cellular or mobile phone communications transceivers. In some embodiments, multiple controllers and smart actuator devices may communicate using a mesh topology. In other embodiments, communications interfaces 918 and 952 may be configured to transmit smart actuator device data (e.g., a fault status, an actuator and/or valve position) to an external network. In still further embodiments, communications interfaces 918 and 952 are connected via a wired, rather than wireless, network.

Comparator 920 may be configured to compare the measured zone temperature feedback signal 914 output from digital filter 912 with a zone temperature setpoint value 916. Comparator 920 may then output a temperature error signal 922 that is received by zone temperature controller 924. Comparator 920 may be a discrete electronics part or implemented as part of controller 904. If comparator 920 determines that the zone temperature feedback signal 914 is higher than the zone temperature setpoint value 916 (i.e., building zone 906 is hotter than the setpoint value), zone temperature controller 924 may output a control signal that causes actuator device 902 to modify the flow rate through water coil 950 such that cooling to building zone 906 is increased. If comparator 920 determines that the zone temperature feedback signal 914 is lower than the zone temperature setpoint value 916 (i.e., building zone 906 is cooler than the setpoint value), zone temperature controller 924 may output a control signal that causes actuator device 902 to modify the flow rate through water coil 950 such that heating to building zone 906 is increased.

In various embodiments, zone temperature controller 924 is a pattern recognition adaptive controller (PRAC), a model recognition adaptive controller (MRAC), or another type of tuning or adaptive feedback controller. Adaptive control is a control method in which a controller may adapt to a controlled system with associated parameters which vary, or are initially uncertain. In some embodiments, zone temperature controller 924 is similar or identical to the adaptive feedback controller described in U.S. Pat. No. 8,825,185, granted on Sep. 2, 2014, the entirety of which is herein incorporated by reference.

Still referring to FIG. 9, actuator device 902 is shown to include a flow/velocity span block 926, a flow/velocity feedback controller 930, a valve actuator 940, and a communications interface 952. Zone temperature error 922 output from comparator 920 may be transmitted to actuator 902 via zone temperature controller 924. Flow/velocity span block 926 may be configured to enforce allowable maximum and minimum flow range limits on the received zone temperature error 922. For example, a technician installing the components of cascaded control system 900 or an administrator of HVAC system 100 may input a maximum and/or a minimum flow range limit for the flow/velocity span block 926. In some embodiments, the flow range limits are transmitted via mobile device (e.g., a smart phone, a table) and are received via communications interface 952 of actuator device 902. In other embodiments, the flow range limits are transmitted to interface 952 via wired network.

Flow/velocity feedback controller 930 is configured to receive a flow rate/velocity setpoint signal 928 from flow/velocity span block 926 and a flow rate/velocity feedback signal 932 from digital filter 938. In an exemplary embodiment, flow/velocity feedback controller 930 is configured to implement a PVDC technique as described above with reference to FIG. 8.

Flow/velocity feedback controller 930 may be configured to output an actuator control signal 944 (e.g., a DC signal, an AC signal) to valve actuator 940. In some embodiments, valve actuator 940 is identical or substantially similar to actuators 502, 602, and 702 as described with reference to FIGS. 5-7. For example, valve actuator 940 may be a linear actuator (e.g., a linear proportional actuator), a non-linear actuator, a spring return actuator, or a non-spring return actuator. Valve actuator 940 may include a drive device coupled to valve 946 and configured to rotate a shaft of valve 946. In some embodiments, valve 946 is identical or substantially similar to valves 504, 604 and 704 as described with reference to FIGS. 5-7. For example, in various embodiments, valve 946 may be a 2-way or 3-way two position electric motorized valve, a ball isolation valve, a floating point control valve, an adjustable flow control device, or a modulating control valve.

Still referring to FIG. 9, feedback control system 900 is further shown to include a flow rate sensor 948. In some embodiments, flow rate sensor 948 is identical or substantially similar to the flow rate sensors 510 and 610 as described with reference to FIGS. 5 and 6. For example, in various embodiments, flow rate sensor 948 may be a heated thermistor flow sensor or a vortex-shedding flowmeter. Flow rate sensor 948 may be disposed upstream of valve 946 to measure the flow rate and/or velocity of fluid entering valve 946. Once collected, measured flow rate and/or velocity data 942 from flow rate sensor 948 may be provided to flow/velocity feedback controller 930 of actuator device 902.

Fluid that passes through valve 946 may flow through water coil 950. In some embodiments, valve 946 is used to modulate an amount of heating or cooling provided to the supply air for building zone 906. In various embodiments, water coil 950 may be used to achieve zone setpoint temperature 916 for the supply air of building zone 906 or to maintain the temperature of supply air for building zone 906 within a setpoint temperature range. The position of valve 946 may affect the amount of heating or cooling provided to supply air via water coil 950 and may correlate with the amount of energy consumed to achieve a desired supply air temperature.

Figure 10:
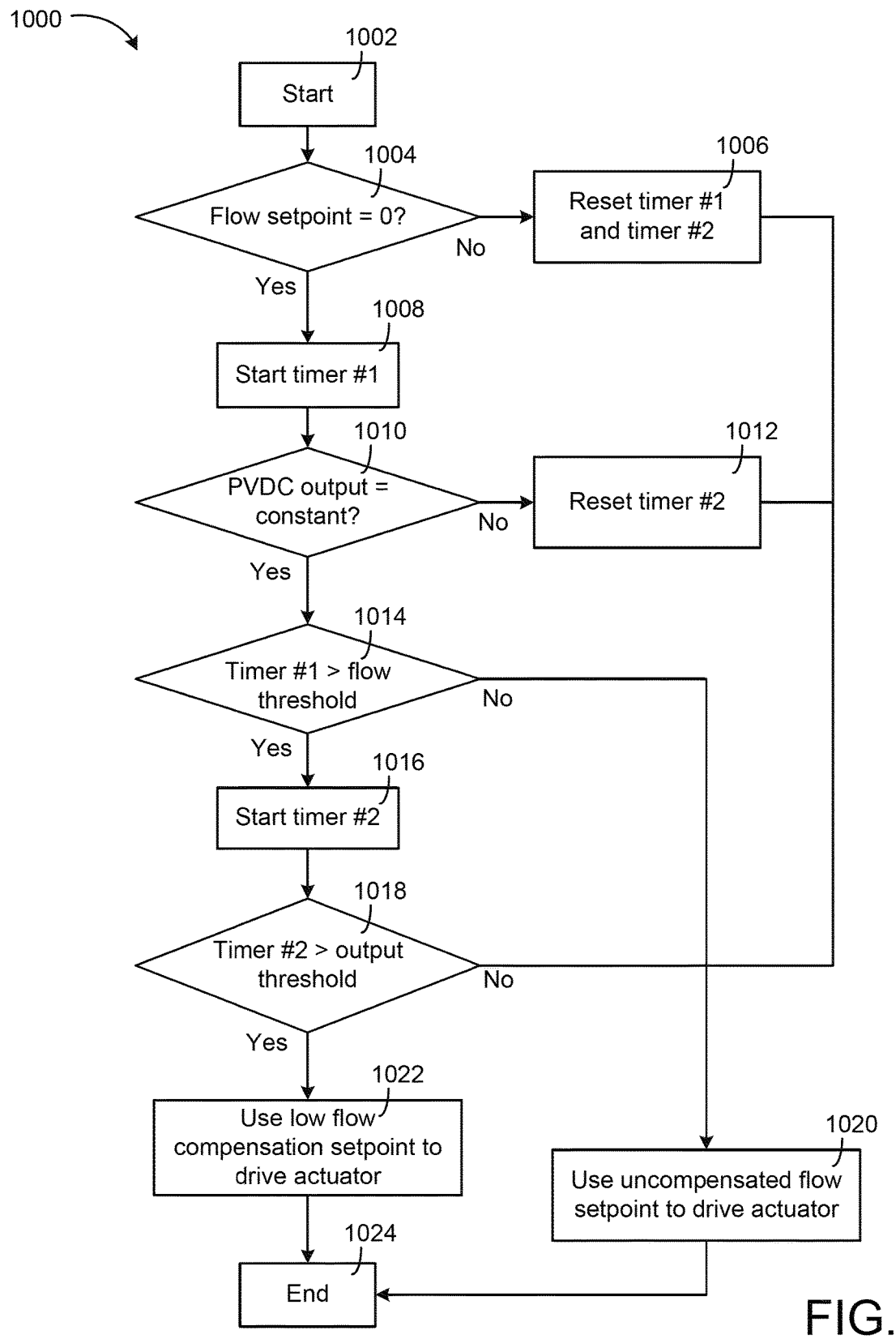
FIG. 10 is a flow chart of a process for implementing low flow bypass control of an actuator and valve system, according to some embodiments.

Turning now to FIG. 10, a flow chart of a process 1000 for implementing low flow bypass control of a valve assembly is shown, according to some embodiments. Low flow bypass control of the valve assembly may be implemented when several low flow criteria are satisfied. In various embodiments, process 1000 may be performed by a feedback control system (e.g., feedback control system 900, described above with reference to FIG. 9). Specifically, one or more steps of the process 1000 may be performed by a controller (e.g., flow/velocity controller 930). For the purposes of simplicity, process 1000 will be described below as if performed by feedback control system 900, although process 1000 could be performed by any suitable feedback control system.

Process 1000 is shown to commence with step 1002, in which the controller 930 initiates the low flow bypass control process. In some embodiments, process 1000 may be implemented as a state machine, and controller 930 may be configured to initiate process 1000 at step 1002 at every time step. In some embodiments, process 1000 is initiated approximately every second. At step 1004, the controller 930 may determine whether the value of the flow setpoint input 928 to the controller 930 is equal to zero. In other embodiments, the controller 930 may determine whether the value of the flow setpoint input satisfies (i.e., is equal to or less than) a certain nonzero low flow rate value threshold.

If the controller 930 determines that the value of the flow setpoint input is not equal to zero at step 1004, controller 930 resets a first timer ("timer #1") and a second timer ("timer #2") at step 1006. As described in further detail below, the first timer may be used to determine a period of time that a flow setpoint input is equal to zero or less than a nonzero low flow rate value threshold, and the second timer may be used to determine a period of time that an output of a PVDC technique is steady or not changing (i.e., not decreasing to meet the zero flow setpoint input). For example, the output of the PVDC technique may be an actuator position command. After the first timer and the second timer are reset at step 1006, process 1000 may advance to step 1020, in which the controller 930 operates under normal procedures and uses the uncompensated setpoint input and the output of the PVDC technique to generate a command output 944 for the valve actuator 940 to drive the valve 946 (e.g., using a drive device 730). Process 1000 then concludes at step 1024.

However, returning to step 1004, if the controller 930 determines that the flow setpoint input is zero or below a low flow rate value threshold, controller 930 starts the first timer at step 1008. The first timer may be configured to run until it saturates. Once the first timer has saturated, process 1000 then advances to step 1010, in which the controller 930 determines whether the output of the PVDC technique is steady. If the controller 930 determines that the PVDC output is changing or nonsteady (i.e., decreasing to meet the zero flow setpoint input), controller 930 advances to step 1012 and resets the second timer before advancing to step 1020, and uses the uncompensated setpoint input and the output of the PVDC technique to command the valve 946 before concluding at step 1024.

However, returning to step 1010, if controller 930 determines that the output of the PVDC technique has been steady for a specified period time (i.e., the change in output does not exceed an output change threshold), controller 930 advances to step 1014, and determines whether the elapsed time measured by the first timer satisfies a zero or low flow setpoint time threshold. In some embodiments, the zero or low flow time threshold may be related to the stroke time of the actuator (i.e., the time it takes for the actuator to move from a fully closed position to a fully open position). Stated differently, the controller 930 determines whether the flow setpoint input has been zero or below a low flow threshold for at least a specified period of time. If the controller 930 determines that the elapsed time measured by the first timer does not satisfy the low flow setpoint time threshold, controller 930 advances to step 1020 and uses the uncompensated setpoint input and the output of the PVDC technique to command the valve 946 before concluding at step 1024.

However, returning to step 1014, if the controller 930 determines that the first timer satisfies the low flow setpoint time threshold, controller 930 advances to step 1016 and starts the second timer. The second timer may be configured to run as long as the output of the PVDC technique is steady (i.e., not decreasing to meet the zero or low flow setpoint input). At step 1018, the controller 930 determines whether the elapsed time measured by the second timer satisfies a steady PVDC output time threshold. In some embodiments, similar to the zero or low flow setpoint time threshold, the PVDC output time threshold may be related to the stroke time of the actuator. Stated differently, the controller 930 determines whether the PVDC output has been constant for at least a specified period of time. If the controller 930 determines that the elapsed time measured by the second timer does not exceed the steady PVDC output time threshold (i.e., that the PVDC output has been responsive to the zero or low flow setpoint input), controller 930 advances to step 1020 and uses the uncompensated setpoint input and the output of the PVDC technique to command the valve 946 before concluding at step 1024.

Returning to step 1018, if the controller 930 determines that the elapsed time measured by the second timer does satisfy the steady PVDC output time threshold, controller 930 advances to step 1022 and uses a low flow compensation setpoint to control the valve 946. In some embodiments, the low flow compensation setpoint involves replacing or modifying the flow rate setpoint 928. For example, the low flow compensation setpoint may be calculated by subtracting a low flow compensation value from the flow rate setpoint 928. The low flow compensation value may be a set value that is user-configurable, or it may be a function of system characteristics (e.g., actuator stroke time, minimum pulse width, maximum flow).

In some embodiments, the low flow compensation setpoint has a negative value. Although a negative flow rate setpoint is obviously not physically achievable, the use of a negative flow rate setpoint may act to shift the deadband so that the flow rate measurement falls outside the deadband region. This in turn increases the error between the measured flow rate 932 and the flow rate setpoint to a nonzero value, prompting the controller 930 to output actuator command signals 944 that drive the valve actuator 940 to close the valve 946. In some embodiments, step 1022 includes the controller 930 commanding the valve actuator 940 to drive the valve 946 to a fully closed (i.e., zero flow) position. Upon controlling the valve actuator 940 to the position mandated by the low flow compensation setpoint, process 1000 concludes at step 1024.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling a flow rate of a fluid through a valve, the system comprising:
   a valve configured to regulate a flow of fluid through a conduit;
   an actuator comprising a motor and a drive device, the drive device driven by the motor and coupled to the valve for driving the valve between multiple positions;
   a flow rate sensor configured to measure the flow rate of the fluid through the valve; and
   a controller that is communicably coupled with the flow rate sensor and the motor, the controller configured to:
      receive a first flow rate setpoint;
      determine a first actuator position setpoint using a proportional variable deadband control technique based on the first flow rate setpoint and at least one flow rate measurement from the flow rate sensor;
      operate the motor to drive the drive device to the first actuator position setpoint;
      receive a second flow rate setpoint; and
      in response to a determination that each of a plurality of low flow criteria are satisfied, determine a second actuator position setpoint using the proportional variable deadband control technique based on a low flow compensation setpoint and at least one of the at least one flow rate measurement from the flow rate sensor, wherein the low flow compensation setpoint causes the controller to set the second actuator position setpoint to a value corresponding to a fully closed position of the valve using the proportional variable deadband control technique.

2. The system of claim 1, wherein the low flow compensation setpoint has a negative flow rate value.

3. The system of claim 1, wherein the low flow compensation setpoint is calculated by subtracting a low flow compensation value from the second flow rate setpoint.

4. The system of claim 1, wherein the plurality of low flow criteria comprises the second flow rate setpoint satisfying a low flow rate value threshold.

5. The system of claim 4, wherein the plurality of low flow criteria comprises a first elapsed time measured by a first timer satisfying a low flow rate time threshold.

6. The system of claim 5, wherein the plurality of low flow criteria comprises a second elapsed time measured by a second timer satisfying a steady output time threshold.

7. The system of claim 1, wherein the flow rate sensor is an ultrasonic flow rate sensor.

8. The system of claim 1, wherein the controller is further configured to operate the motor to drive the drive device to the second actuator position setpoint.

9. A method for controlling a flow rate of a fluid through a valve, the method comprising:
   receiving a first flow rate setpoint;
   determining a first actuator position setpoint using a proportional variable deadband control technique based on the first flow rate setpoint and at least one flow rate measurement from a flow rate sensor;
   driving an actuator to the first actuator position setpoint, wherein the actuator is coupled to the valve in order to drive the valve between multiple positions;
   receiving a second flow rate setpoint; and
   in response to a determination that a low flow condition exists, determining a second actuator position setpoint using the proportional variable deadband control technique based on a low flow compensation setpoint and at least one of the at least one flow rate measurement from the flow rate sensor, wherein the low flow compensation setpoint has a negative flow rate value.

10. The method of claim 9, further comprising calculating the low flow compensation setpoint by subtracting a low flow compensation value from the second flow rate setpoint.

11. The method of claim 9, wherein the low flow condition is determined in response to a determination that each of a plurality of low flow criteria are satisfied, whrein the plurality of low flow criteria comprises the second flow rate setpoint satisfying a low flow rate value threshold.

12. The method of claim 11, wherein the plurality of low flow criteria comprises a first elapsed time measured by a first timer satisfying a low flow rate time threshold.

13. The method of claim 12, wherein the plurality of low flow criteria comprises a second elapsed time measured by a second timer satisfying a steady output time threshold.

14. The method of claim 9, further comprising driving the actuator to the second actuator position setpoint.

15. The method of claim 9, wherein the second actuator position setpoint corresponds with a fully closed valve position.

16. A system for controlling a flow rate of a fluid through a valve, the system comprising:
   a valve configured to regulate a flow of fluid through a conduit;
   an actuator comprising a motor and a drive device, the drive device driven by the motor and coupled to the valve for driving the valve between multiple positions;
   a flow rate sensor configured to measure the flow rate of the fluid through the valve; and
   a controller that is communicably coupled with the flow rate sensor and the motor, the controller configured to:
      receive a flow rate measurement from the flow rate sensor;
      receive a flow rate setpoint;
      in response to a determination that the flow rate setpoint satisfies a low flow rate value threshold, begin a first timer;
      in response to a determination that an output of a proportional variable deadband control technique does not exceed an output change threshold, determine whether an elapsed time of the first timer satisfies a low flow rate time threshold;
      in response to a determination that the elapsed time of the first timer satisfies the low flow rate time threshold, begin a second timer;
      in response to a determination that an elapsed time of the second timer satisfies a steady output time threshold, determine an actuator position setpoint using the proportional variable deadband control technique based on a low flow compensation setpoint and the flow rate measurement.

17. The system of claim 16, wherein the proportional variable deadband control technique comprises determining whether the flow rate measurement is within a deadband range centered on the low flow compensation setpoint.

18. The system of claim 16, wherein the low flow compensation setpoint has a negative flow rate value.

* * * * *